(12) United States Patent
Kumar et al.

(10) Patent No.: US 12,293,056 B2
(45) Date of Patent: May 6, 2025

(54) FADING PIREP ICONS BASED ON VALIDITY OF REPORT

(71) Applicant: The Boeing Company, Arlington, VA (US)

(72) Inventors: Nitin Kumar, Frankfurt am Main (DE); Michael Gottscheck, Frankfurt (DE)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/316,123

(22) Filed: May 11, 2023

(65) Prior Publication Data

US 2024/0377920 A1    Nov. 14, 2024

(51) Int. Cl.
*G06F 3/04817* (2022.01)
*G08G 5/00* (2006.01)

(52) U.S. Cl.
CPC ....... *G06F 3/04817* (2013.01); *G08G 5/0021* (2013.01); *G08G 5/0091* (2013.01)

(58) Field of Classification Search
CPC . G06F 3/04817; G08G 5/0021; G08G 5/0091
See application file for complete search history.

(56) References Cited

U.S. PATENT DOCUMENTS

| | | | | |
|---|---|---|---|---|
| 5,671,342 A * | 9/1997 | Millier | ................. | G09B 29/106 345/418 |
| 6,501,392 B2 * | 12/2002 | Gremmert | ............ | G08G 5/0091 340/945 |
| 6,670,970 B1 * | 12/2003 | Bonura | ................. | G06F 3/0484 345/592 |
| 7,243,130 B2 * | 7/2007 | Horvitz | ................. | H04L 67/306 709/206 |
| 7,343,562 B2 * | 3/2008 | Bonura | ................. | G06F 3/0482 715/768 |
| 7,467,031 B2 * | 12/2008 | King | .................... | G01C 23/005 701/4 |
| 7,612,688 B1 | 11/2009 | Vigeant-Langlois et al. | | |
| 7,620,905 B2 * | 11/2009 | Boss | ..................... | G06F 3/0481 715/768 |
| 7,667,621 B2 * | 2/2010 | Dias | ..................... | G08G 5/0091 340/963 |
| 8,130,121 B2 * | 3/2012 | Smith | .................. | G08G 5/0013 340/963 |
| 8,200,416 B2 * | 6/2012 | Aspen | ................... | G09B 29/106 340/963 |

(Continued)

FOREIGN PATENT DOCUMENTS

FR    2979427 A1 *    3/2013    ............. G01C 23/00

OTHER PUBLICATIONS

Extended European Search Report, dated Nov. 8, 2024, regarding U.S. Appl. No. 18/316,123, 10 pages.

*Primary Examiner* — Benjamin Smith
(74) *Attorney, Agent, or Firm* — Yee & Associates, P.C.

(57) ABSTRACT

A method for displaying pilot reports provided. The method comprises graphically displaying a flight plan for an aircraft in a user interface and receiving a number of pilot reports. Icons representing the pilot reports are displayed in the user interface in relation to the flight plan. Respective opacities of the icons in the user interface are progressively decreased according to respective ages of the icons. Each icon expires and disappears from the user interface upon reaching a specified maximum age.

20 Claims, 7 Drawing Sheets

(56) References Cited

U.S. PATENT DOCUMENTS

| | | | | |
|---|---|---|---|---|
| 8,230,355 B1* | 7/2012 | Bauermeister | G06F 3/04817 | 715/765 |
| 8,249,806 B1* | 8/2012 | McCusker | G08G 5/0013 | 701/457 |
| 8,265,806 B2* | 9/2012 | Coulmeau | G01C 23/00 | 701/14 |
| 8,762,035 B2* | 6/2014 | Levine | G01C 21/3492 | 701/410 |
| 8,839,150 B2* | 9/2014 | King | G06F 16/168 | 715/837 |
| 8,874,288 B1* | 10/2014 | Siddiqui | G08G 5/0091 | 701/1 |
| 9,183,681 B2* | 11/2015 | Fish | G06F 3/0482 | |
| 9,234,982 B2* | 1/2016 | Ramaiah | G08G 5/0013 | |
| 9,338,116 B2* | 5/2016 | Langlois | G06F 3/0481 | |
| 9,342,206 B1* | 5/2016 | Andres | G06F 16/9537 | |
| 9,349,296 B2* | 5/2016 | Wiesemann | G08G 5/0013 | |
| 9,448,691 B2* | 9/2016 | Suda | G06F 3/0482 | |
| 9,678,622 B2* | 6/2017 | Lim | G06F 3/04817 | |
| 9,702,726 B2* | 7/2017 | Turner | B64D 43/02 | |
| 9,728,093 B2* | 8/2017 | Wiesemann | G08G 5/0047 | |
| 9,836,182 B2* | 12/2017 | Park | G06F 3/0488 | |
| 9,967,467 B2* | 5/2018 | Gao | H04N 23/632 | |
| 10,109,203 B2* | 10/2018 | Chmelarova | G08G 5/025 | |
| 10,296,179 B2* | 5/2019 | Nama | G01C 23/00 | |
| 10,459,078 B2* | 10/2019 | Khatwa | G01C 23/005 | |
| 10,514,821 B2* | 12/2019 | Liang | G06F 3/04817 | |
| 10,521,070 B2* | 12/2019 | Plasmeier | G06F 3/0482 | |
| 10,529,242 B2* | 1/2020 | Shamasundar | G08G 5/0021 | |
| 10,536,644 B2* | 1/2020 | Gao | H04N 21/2743 | |
| 10,540,899 B2* | 1/2020 | Moravek | G08G 5/0047 | |
| 10,573,051 B2* | 2/2020 | Henry | G06F 3/048 | |
| 10,754,501 B2* | 8/2020 | Chiba | G06F 3/041 | |
| 10,997,769 B2* | 5/2021 | Malviya | G09G 5/377 | |
| 11,039,044 B2* | 6/2021 | Kniffen | H04N 5/144 | |
| 11,106,329 B2* | 8/2021 | He | B64D 43/00 | |
| 11,482,123 B2* | 10/2022 | Katz | G08G 5/0013 | |
| 11,587,447 B2* | 2/2023 | Ramachandra | G08G 5/0039 | |
| 11,647,259 B2* | 5/2023 | McClendon | H04N 21/482 | 725/32 |
| 11,650,710 B2* | 5/2023 | Plasmeier | G06F 3/04842 | 715/811 |
| 11,653,086 B2* | 5/2023 | Gao | H04N 21/2743 | 348/333.11 |
| 11,682,311 B2* | 6/2023 | He | G08G 5/0013 | 701/14 |
| 2002/0039072 A1* | 4/2002 | Gremmert | G08G 5/0052 | 340/963 |
| 2004/0090467 A1* | 5/2004 | Bonura | G09G 5/14 | 715/790 |
| 2006/0129286 A1* | 6/2006 | King | G01C 23/005 | 701/4 |
| 2007/0006162 A1* | 1/2007 | Iho | G06F 9/451 | 715/866 |
| 2007/0168122 A1* | 7/2007 | Aspen | G01C 23/005 | 701/3 |
| 2007/0245256 A1* | 10/2007 | Boss | G06F 3/0481 | 715/768 |
| 2008/0155438 A1* | 6/2008 | Bonura | G06F 3/04842 | 715/768 |
| 2008/0307335 A1* | 12/2008 | Chaudhri | G06F 3/04817 | 715/764 |
| 2009/0150807 A1* | 6/2009 | George | G06F 3/0482 | 715/763 |
| 2010/0057275 A1* | 3/2010 | Schilke | G01W 1/06 | 701/14 |
| 2011/0193788 A1* | 8/2011 | King | G06F 3/017 | 345/173 |
| 2012/0110483 A1* | 5/2012 | Arcese | G06F 3/04817 | 715/768 |
| 2012/0232785 A1* | 9/2012 | Wiesemann | G08G 5/0021 | 701/423 |
| 2013/0125056 A1* | 5/2013 | Suda | G06F 3/0488 | 715/846 |
| 2013/0268885 A1* | 10/2013 | Lim | G06F 3/04817 | 715/846 |
| 2014/0123047 A1* | 5/2014 | Solarino | G06F 3/04817 | 715/772 |
| 2014/0249735 A1* | 9/2014 | Levine | G01C 21/3438 | 701/117 |
| 2014/0289674 A1* | 9/2014 | Jin | G06F 9/542 | 715/810 |
| 2014/0351726 A1* | 11/2014 | King | G06F 3/017 | 715/765 |
| 2015/0007049 A1* | 1/2015 | Langlois | G06F 3/017 | 715/752 |
| 2015/0019047 A1* | 1/2015 | Chandrashekarappa | G08G 5/0021 | 701/3 |
| 2015/0039176 A1* | 2/2015 | Fish | G07C 5/008 | 701/31.6 |
| 2015/0121306 A1* | 4/2015 | Fundament | H04N 21/488 | 715/811 |
| 2015/0350414 A1* | 12/2015 | Park | G06F 3/04817 | 455/566 |
| 2016/0162157 A1* | 6/2016 | Liang | G06F 3/0482 | 715/765 |
| 2016/0232797 A1* | 8/2016 | Wiesemann | G08G 5/0047 | |
| 2016/0353030 A1* | 12/2016 | Gao | H04N 21/41407 | |
| 2017/0083206 A1* | 3/2017 | He | G06F 3/04845 | |
| 2017/0115848 A1* | 4/2017 | Plasmeier | G06F 3/0482 | |
| 2017/0138759 A1* | 5/2017 | Turner | G08G 5/0047 | |
| 2017/0183105 A1* | 6/2017 | Fournier | B64D 45/00 | |
| 2017/0308268 A1* | 10/2017 | Chiba | G06F 3/04817 | |
| 2018/0068569 A1* | 3/2018 | Chmelarova | G01C 21/20 | |
| 2018/0074189 A1* | 3/2018 | Khatwa | G01W 1/10 | |
| 2018/0144643 A1* | 5/2018 | Moravek | G08G 5/0021 | |
| 2018/0238996 A1 | 8/2018 | Gurusamy et al. | | |
| 2018/0253982 A1* | 9/2018 | Shamasundar | G08G 5/003 | |
| 2018/0255246 A1* | 9/2018 | Gao | H04N 21/488 | |
| 2019/0057534 A1* | 2/2019 | Henry | G06F 9/451 | |
| 2020/0133465 A1* | 4/2020 | Plasmeier | G06F 3/04842 | |
| 2020/0134900 A1* | 4/2020 | Malviya | G08G 5/0052 | |
| 2020/0154052 A1* | 5/2020 | Gao | H04N 21/41407 | |
| 2021/0009281 A1* | 1/2021 | He | G01C 23/00 | |
| 2021/0233414 A1* | 7/2021 | Ramachandra | G08G 5/0039 | |
| 2021/0373717 A1* | 12/2021 | McClure | F25D 29/005 | |
| 2022/0013022 A1* | 1/2022 | He | G09B 9/16 | |
| 2022/0201369 A1* | 6/2022 | McClendon | H04N 21/234345 | |
| 2023/0103832 A1* | 4/2023 | Takacs | G08G 5/0052 | 701/120 |
| 2023/0215280 A1* | 7/2023 | Samuthirapandian | G08G 5/0021 | 701/14 |
| 2023/0239545 A1* | 7/2023 | McClendon | H04N 21/47815 | 725/32 |
| 2023/0315247 A1* | 10/2023 | Pastrana | G06F 1/1694 | 715/716 |
| 2023/0392954 A1* | 12/2023 | Rao | G01C 23/005 | |

* cited by examiner

FADING PIREP ICONS BASED ON VALIDITY OF REPORT

BACKGROUND INFORMATION

Technical Field

The present disclosure relates generally to data management systems, and more specifically to visual depiction of pilot reports according to the age of the reports.

Background

A pilot report (PIREP) is a report submitted by a pilot regarding current or forecasted weather and flight conditions or other information that might pertain to flight safety. Such PIREPs are typically submitted to air traffic control or a flight service station. Examples of PIREPs include reports regarding turbulence, icing, thunderstorms, wind shear, and visibility.

PIREPs usually include location, altitude, time, and a description of the conditions in question. Such information can assist other pilots to make decisions regarding their own flights such as adjusting route or altitude.

SUMMARY

An illustrative embodiment provides a method for displaying pilot reports. The method comprises graphically displaying a flight plan for an aircraft in a user interface and receiving a number of pilot reports. Icons representing the pilot reports are displayed in the user interface in relation to the flight plan. Respective opacities of the icons in the user interface are progressively decreased according to respective ages of the icons. Each icon expires and disappears from the user interface upon reaching a specified maximum age. Opacities of the icons can decrease in a stepwise manner approximately 25% every 30 minutes.

Another illustrative embodiment provides a system for displaying pilot reports. The system comprises a storage device that stores program instructions and one or more processors operably connected to the storage device and configured to execute the program instructions to cause the system to: graphically display a flight plan for an aircraft in a user interface; receive a number of pilot reports; display icons representing the pilot reports in the user interface in relation to the flight plan; and progressively decrease respective opacities of the icons in the user interface according to respective ages of the icons, wherein each icon expires and disappears from the user interface upon reaching a specified maximum age. The system can replace an aged icon among the icons with a new icon at full opacity responsive to renewed confirmation of a previous pilot report represented by the aged icon.

Another illustrative embodiment provides a computer program product for displaying pilot reports. The computer program product comprises a computer-readable storage medium having program instructions embodied thereon to perform the steps of: graphically displaying a flight plan for an aircraft in a user interface; receiving a number of pilot reports; displaying icons representing the pilot reports in the user interface in relation to the flight plan; and progressively decreasing respective opacities of the icons in the user interface according to respective ages of the icons, wherein each icon expires and disappears from the user interface upon reaching a specified maximum age.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that PIREPs are submitted by pilots regarding current or forecasted weather and flight conditions or other information that might pertain to flight safety. Such information can assist other pilots to make decisions regarding their own flights.

The illustrative embodiments also recognize and take into account that PIREPs generally have a validity of two hours. As the report ages, it becomes less significant for a flight.

The illustrative embodiments also recognize and take into account that existing solutions provide different icons that specify type and severity of PIREP conditions. However, existing solutions rarely indicate the age of a PIREP.

The illustrative embodiments provide a PIREP display system that progressively fades the PIREP icons according to their age. Thus, when a user observes a PIREP the user can make better informed decisions depending on where the aircraft will be relative to the location and darkness (opacity) of a PIREP icon. Therefore, the fading PIREP icons assist pilots and dispatcher in making forward looking decisions.

Figure 1:
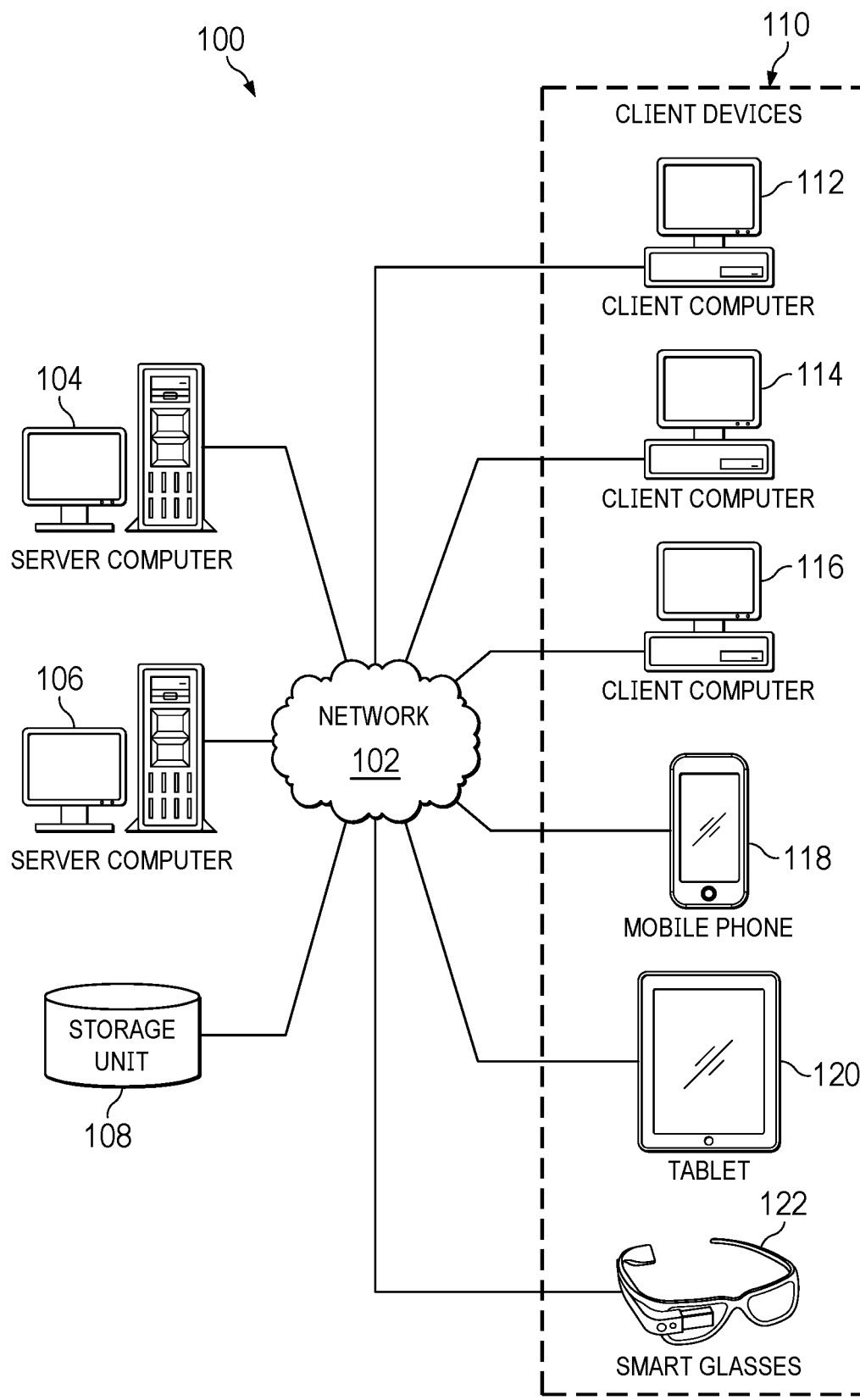
FIG. 1 is a pictorial representation of a network of data processing systems in which illustrative embodiments can be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
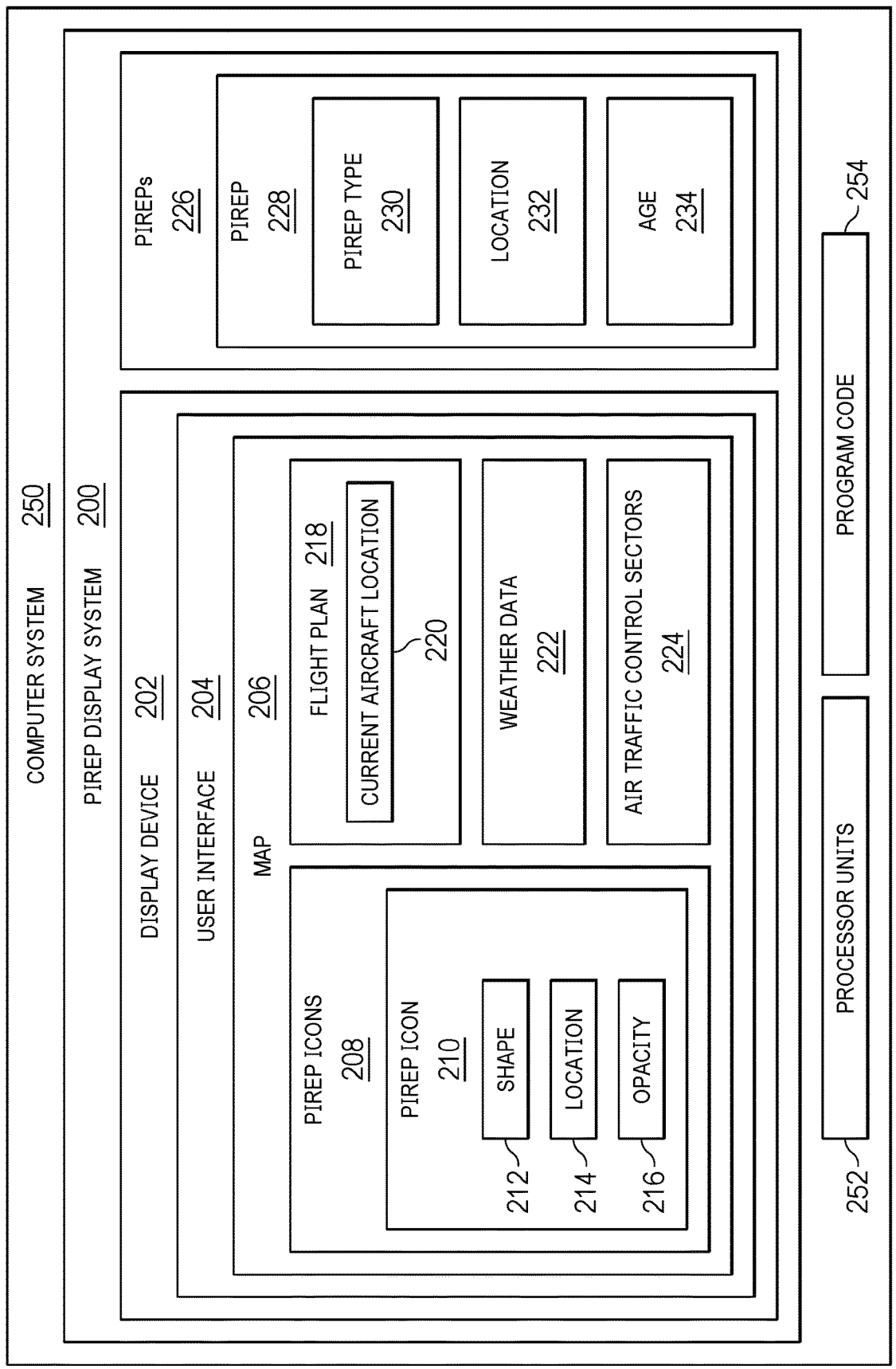
FIG. 2 is an illustration of a block diagram of a PIREP display system in accordance with an illustrative embodiment.

With reference now to FIG. 2, an illustration a block diagram of a pilot report (PIREP) display system is depicted in accordance with an illustrative embodiment. In this illustrative example, PIREP display system 200 includes components that can be implemented in hardware such as the hardware shown in network data processing system 100 in FIG. 1.

PIREP display system 200 receives a number of PIREPs 226 which have been submitted by pilots. Each PIREP 228 has a PIREP type 230. Examples of PIREP types include turbulence PIREPs, icing PIREPs, weather PIREPs. PIREP 228 applies to a particular location 232 and has an age 234, which refers to the lapsed time from when the PIREP was first submitted.

PIREP display system 200 provides information to a user in a user interface 204 generated by display device 202. Display device 202 is a physical hardware system that might be part of, e.g., an electronic flight bag (EFB) which is an electronic information management system that assists flight crews in performing flight management tasks. User interface 204 can be a graphical user interface.

The display device 202 can include at least one of a light emitting diode (LED) display, a liquid crystal display (LCD), an organic light emitting diode (OLED) display, a computer monitor, a projector, a flat panel display, a heads-up display (HUD), a head-mounted display (HMD), or some other suitable device that can output information for the visual presentation of information.

User interface displays a map 206 on which are projected a number of PIREP icons 208 corresponding to PIREPs 226. Each PIREP icon 210 has a characteristic shape 212 corresponding to the PIREP type 230. The PIREP icon 210 designates the location 214 on the map 206 to which the corresponding PIREP 228 applies. Each PIREP icon 210 is displayed in user interface 204 with a level of opacity 216. The opacity 216 of each PIREP icon 210 progressively decreases with the age 234 of the corresponding PIREP 228 (see FIGS. 4 and 5).

User interface 204 also displays a flight plan 218 of an aircraft and the current aircraft location 220 along the flight plan. User interface 204 allows the user to see where the PIREPs 226 occur relative to the flight pan 218 and the likelihood that any PIREP along the flight plan will still be relevant by the time the aircraft reaches that location.

User interface 204 might also display weather data 222 as well as indications of air traffic control sectors 224 on map 206.

PIREP display system 200 can be implemented in software, hardware, firmware, or a combination thereof. When software is used, the operations performed by PIREP display system 200 can be implemented in program code configured to run on hardware, such as a processor unit. When firmware is used, the operations performed by PIREP display system 200 can be implemented in program code and data and stored in persistent memory to run on a processor unit. When hardware is employed, the hardware can include circuits that operate to perform the operations in PIREP display system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium.

The communications medium can be a network. The data processing systems can be selected from at least one of a computer, a server computer, a tablet computer, or some other suitable data processing system.

As depicted, computer system 250 includes a number of processor units 252 that are capable of executing program code 254 implementing processes in the illustrative examples. As used herein a processor unit in the number of processor units 252 is a hardware device and is comprised of hardware circuits such as those on an integrated circuit that respond and process instructions and program code that operate a computer. When a number of processor units 252 execute program code 254 for a process, the number of processor units 252 is one or more processor units that can be on the same computer or on different computers. In other words, the process can be distributed between processor units on the same or different computers in a computer system. Further, the number of processor units 252 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
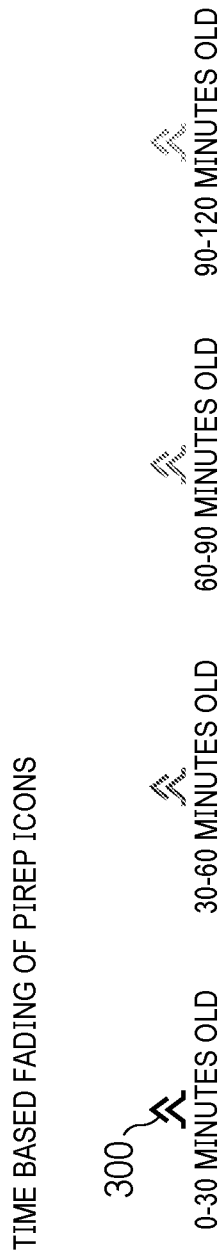
FIG. 3 depicts time based fading of PIREP icons in accordance with an illustrative embodiment.

FIG. 3 depicts time based fading of PIREP icons in accordance with an illustrative embodiment. In the present example, the PIREP icon 300 for severe turbulence is depicted.

As shown in FIG. 3, the degree of opacity of the PIREP icon 300 progressively decreases in a stepwise manner every 30 minutes. For example, for the first 30 minutes, the PIREP icon 300 has full (100%) opacity. After 30 minutes, the opacity of PIREP icon 300 might decrease to 75%. After an hour, the opacity of PIREP icon 300 decreases to 50%, and after 90 minutes the opacity of PIREP icon 300 decreases to 25%. After two hours, the PIREP icon 300 disappears (i.e., 0% opacity).

The total length of time before the PIREP icon 300 disappears might be shorter or longer than two hours. Likewise, the degree of stepwise reduction of opacity might be greater or less than 25% increments.

Alternatively, PIREP icon 300 might fade in a gradual continuous manner. However, discrete stepwise changes in opacity might be easier for users to visually recognize.

Figure 4:
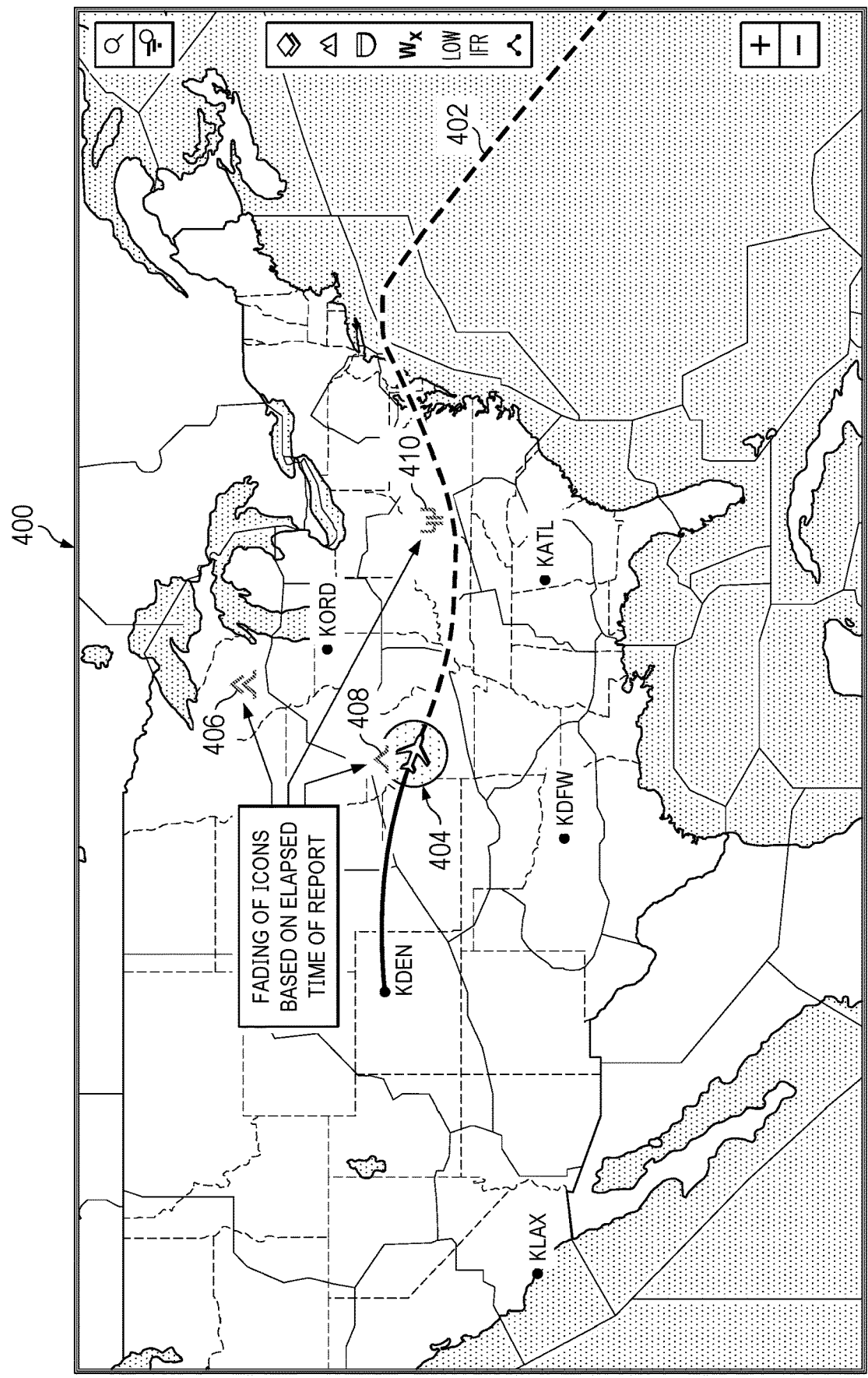
FIG. 4 depicts a pictorial representation of fading PIREP icons relative to a flight plan in accordance with an illustrative embodiment.

FIG. 4 depicts a pictorial representation of fading PIREP icons relative to a flight plan in accordance with an illustrative embodiment. User interface 400 is an example of user interface 204 in FIG. 2. User interface 400 may be employed on an aircraft or in a flight control center.

User interface 400 shows a flight plan 402 for an airplane. Plane icon 404 indicates the current position of the airplane along that flight plan 402. User interface 400 also displays a number of PIREP icons 406, 408, 410. PIREP icon 406 represents sever turbulence, PIREP icon 408 represents moderate turbulence, and PIREP 410 represents moderate icing. The respective degrees of opacity and fading of the PIREP icons are based on elapsed time of the reports.

In the present example, the PIREP icon that is most relevant to the aircraft in question is PIREP icon 410, which lies along the flight plan 402. Based on the age (opacity) of PIREP 410 relative to the current position of plane icon 404 and flight speed of the aircraft in question, the user can determine the likelihood that the icing conditions represented by PIREP icon 410 will still be present and impact the flight by the time the aircraft reaches that location. For example, a dark, fully opaque PIREP icon at a location one and half hours ahead of the current location of an aircraft will not be as significant as a medium opaque (e.g., 50%) PIREP icon 30 minutes ahead of the aircraft.

Figure 5:
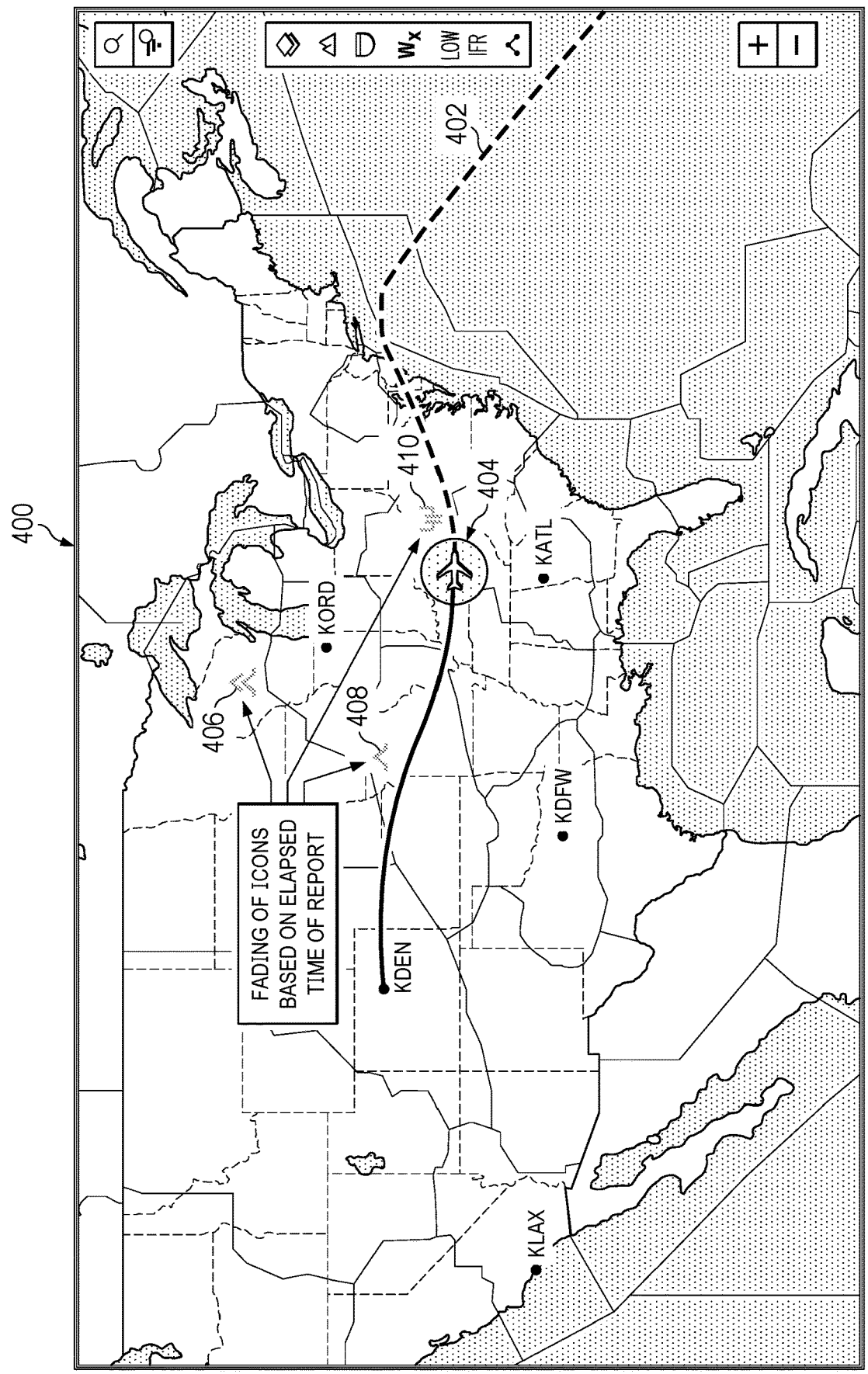
FIG. 5 depicts a pictorial representation of continued fading of PIREP icons during flight progress in accordance with an illustrative embodiment.

FIG. 5 depicts a pictorial representation of continued fading of PIREP icons during flight progress in accordance with an illustrative embodiment. As shown in this view, the position of the airplane, represented by plane icon 404 has traveled closer to the location of PIREP icon 410. However, by this time, PIREP icon 410 has almost completely faded, indicating that the icing conditions previously reported (e.g., 90 minute previously) will not be present when the airplane reaches that location.

As a counter example, if another PIREP reconfirming the continued presence of icing conditions had been submitted in the intervening time period between the views shown in FIGS. 4 and 5, a new, fully opaque PIREP icon would replace aged PIREP icon 410. As a result, the flight in quest might have to reroute to avoid hazardous conditions.

Figure 6:
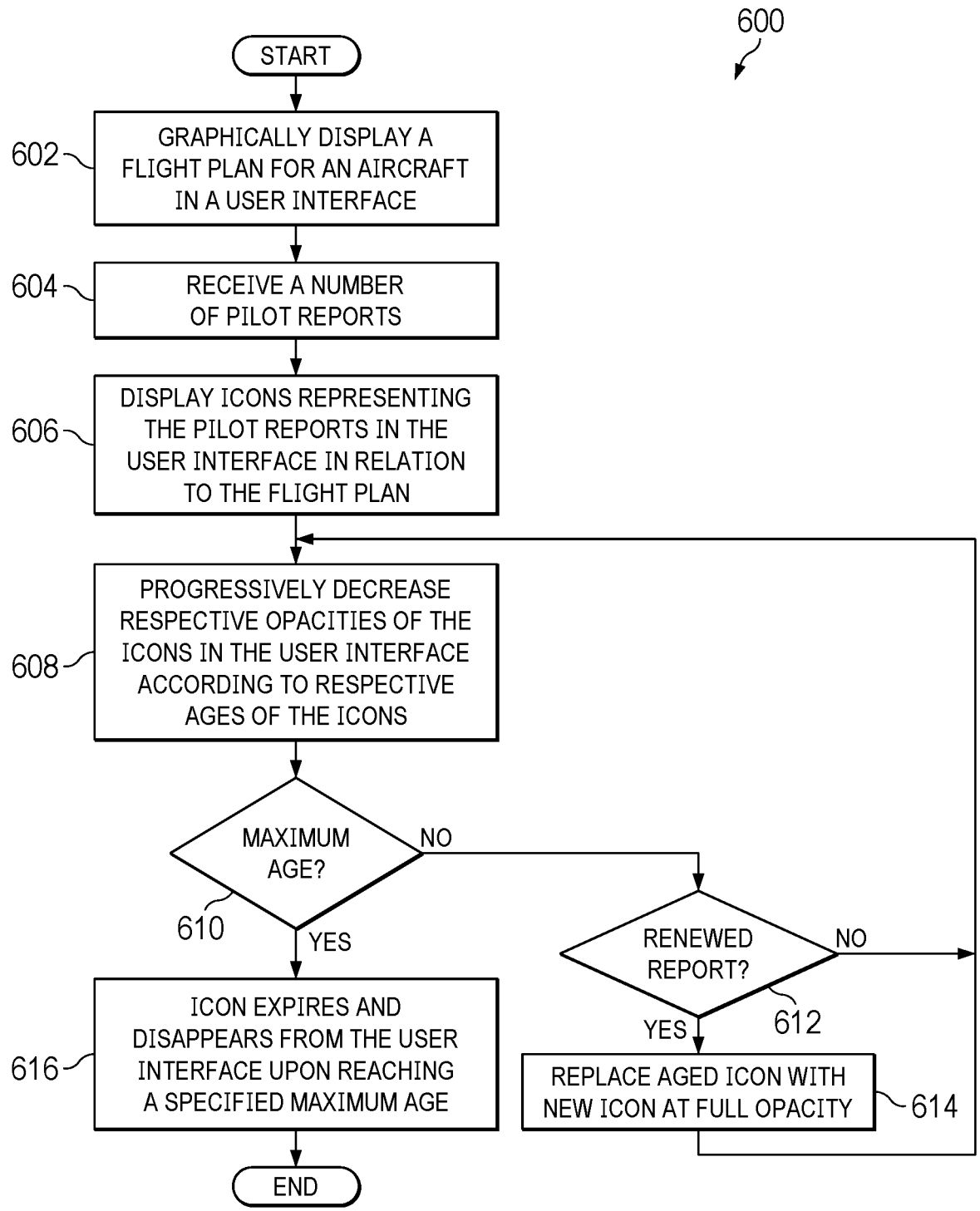
FIG. 6 depicts a flowchart of a process for temporally displaying PIREPS in accordance with an illustrative embodiment.

FIG. 6 depicts a flowchart of a process for displaying pilot reports (PIREPs) in accordance with an illustrative embodiment. The process in FIG. 5 can be implemented in hardware, software, or both. When implemented in software, the process can take the form of program code that is run by one of more processor units located in one or more hardware devices in one or more computer systems. For example, the process can be implemented in PIREP display system 200 in computer system 250 in FIG. 2.

Process 600 begins by graphically displaying a flight plan for an aircraft in a user interface (operation 602).

The system receives a number of pilot reports (operation 604) and displays icons representing the pilot reports in the user interface in relation to the flight plan (operation 606).

The respective opacities of the icons are progressively decreased in the user interface according to the respective ages of the icons (operation 608).

The system determined whether the displayed icons reach a specified maximum age (operation 610). Responsive to a determination that a icon has not yet reached the specified maximum age, the system checks for renewed confirmation of the previous pilot report represented by the icon (operation 612).

Responsive renewed confirmation of a previous pilot report represented by an aged icon, the aged icon is replaced with a new icon at full opacity (operation 614).

Each icon expires and disappears from the user interface upon reaching the specified maximum age (operation 616).

Process 600 then ends.

The flowchart and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 7:
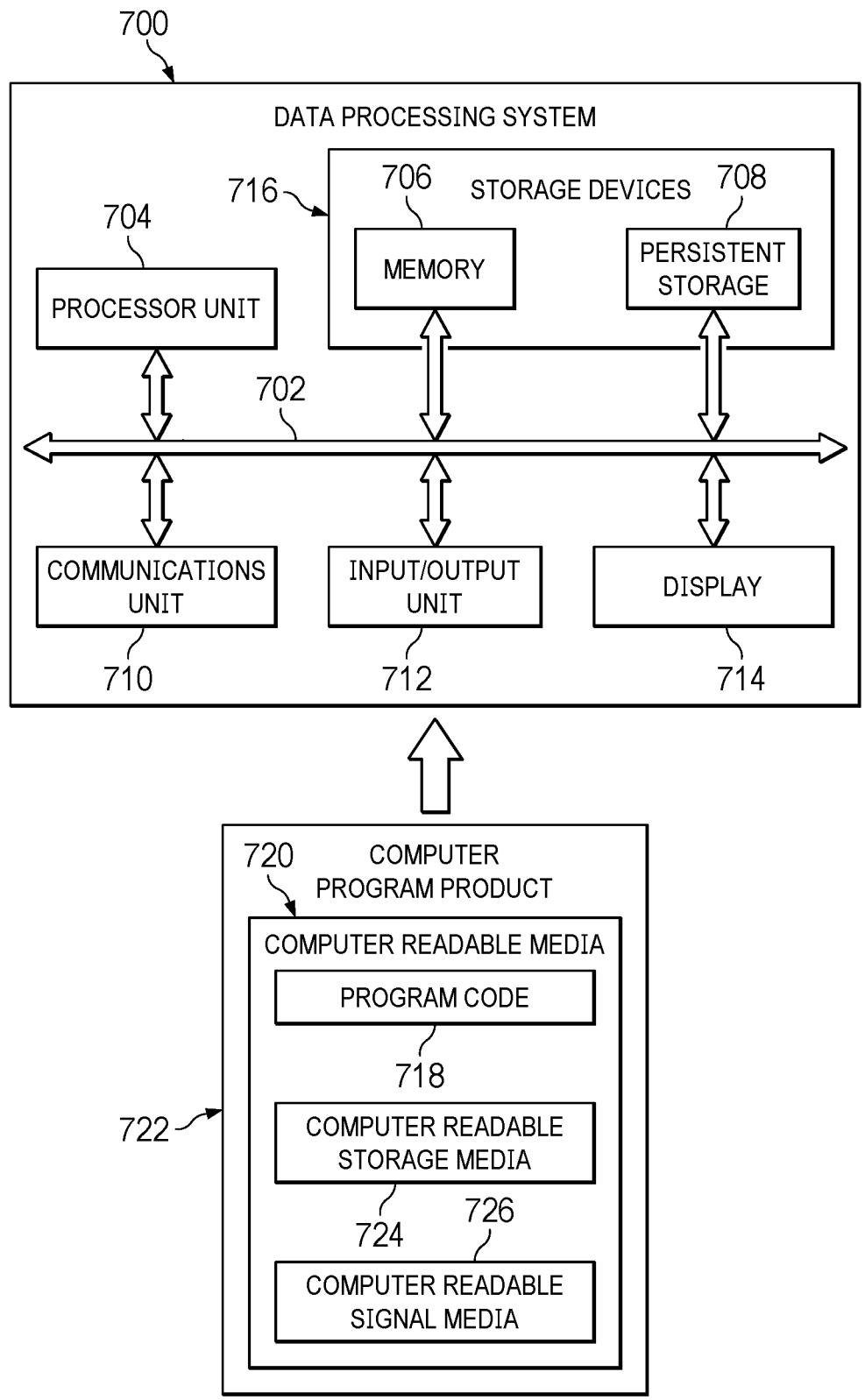
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement server computers 104 and 106 and client devices 110 in FIG. 1, as well as computer system 250 in FIG. 2. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (GPUS).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Computer readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of displaying pilot reports, the method comprising performing, using a number of processors in a computer system, operations of:
    graphically displaying a flight plan for an aircraft in a user interface;
    receiving a pilot report;
    displaying an icon representing conditions reported in the pilot report in the user interface in relation to the flight plan and an opacity indicating a relevance of the conditions to the aircraft at a location affected by the pilot report;
    displaying weather data in the user interface, wherein the flight plan and icons are displayed on a map in the user interface;
    determining an age of the icon;
    responsive to determining that the icon has not reached a maximum age, checking for a renewed confirmation in the computer system of a continued presence of the conditions;
    displaying, responsive finding the renewed confirmation, the icon at full opacity on the user interface and resetting its age in the computer system to new;
    progressively decreasing the opacity of the icon in the user interface until the icon reaches a maximum age in a specified number of discrete steps with each step decreasing the opacity by an equal percentage until reaching zero opacity when the icon reaches the maximum age and then expires and disappears from the user interface, wherein the maximum age is two hours, the specified number of discrete steps is 4, and the equal percentage is 25 of the full opacity.

2. The method of claim 1, further comprising employing the user interface on the aircraft or in a flight control center.

3. The method of claim 1, further comprising displaying a plane icon that indicates a current position of an airplane along the flight plan on the map.

4. The method of claim 1, wherein the pilot report includes a location, an altitude, a time, and a description of the conditions reported.

5. The method of claim 1, wherein the pilot report is regarding current weather or forecasted weather.

6. The method of claim 1, wherein the icon has a shape corresponding to a type of pilot report.

7. The method of claim 1, wherein the pilot report is regarding flight conditions or flight safety.

8. The method of claim 1, wherein the weather data represents at least one selected from the group consisting of: severe turbulence, moderate turbulence, and moderate icing.

9. A system configured to display pilot reports, wherein the system comprises:
    a storage device configured to store program instructions;
    one or more processors operably connected to the storage device and configured to execute the program instructions to cause the system to:
        graphically display a flight plan for an aircraft in a user interface;
        receive a pilot report;
        display an icon that represents conditions reported in the pilot report in the user interface in relation to the flight plan and an opacity indicative of a relevance of the conditions to the aircraft at a location affected by the pilot report;
    display weather data in the user interface, wherein the flight plan and icons are displayed on a map in the user interface;
    determine an age of the icon;
        responsive to a determination that the icon has not reached a maximum age, check for a renewed confirmation in a computer system of a continued presence of the conditions;
        display, responsive finding the renewed confirmation, the icon at full opacity on the user interface and resetting its age in the computer system to new;
        progressively decrease the opacity of the icon in the user interface until the icon reaches a maximum age in a specified number of discrete steps that decrease the opacity to a zero opacity at the maximum age of the icon, whereupon the icon expires and disappears from the user interface, wherein the maximum age is two hours, the specified number of discrete steps are 4, and the opacity decreases 25% of the full opacity every 30 minutes.

10. The system of claim 9, further comprising employing the user interface on the aircraft or in a flight control center.

11. The system of claim 9, further comprising displaying a plane icon that indicates a current position of an airplane along the flight plan on the map.

12. The system of claim 9, wherein the pilot report includes a location, an altitude, a time, and a description of the conditions reported.

13. The system of claim 9, wherein the icon has a shape corresponding to a type of pilot report.

14. The system of claim 9, wherein the pilot report is regarding at least one selected from the group consisting of: current weather, forecasted weather, flight conditions and flight safety.

15. The system of claim 9, wherein the weather data represents at least one selected from the group consisting of: severe turbulence, moderate turbulence, and moderate icing.

16. A computer program product for displaying pilot reports, wherein the computer program product comprises:
a computer-readable storage medium that comprises program instructions embodied thereon and configured to perform the steps of:
display graphically a flight plan for an aircraft in a user interface;
receive a pilot report;
display an icon that represents conditions reported in the pilot report in the user interface in relation to the flight plan and an opacity that indicates a relevance of the conditions to the aircraft at a location affected by the pilot report;
displaying weather data in the user interface, wherein the flight plan and icons are displayed on a map in the user interface;
determine an age of the icon;
responsive to a determination that the icon has not reached a maximum age, check for a renewed confirmation in a computer system of a continued presence of the conditions;
display, responsive finding the renewed confirmation, the icon at full opacity on the user interface and resetting its age in the computer system to new;
progressively decrease the opacity of the icon in the user interface until the icon reaches a maximum age in a specified number of discrete steps that decrease the opacity to a zero opacity at the maximum age of the icon, whereupon the icon expires and disappears from the user interface, wherein the maximum age is two hours, the specified number of discrete steps is four, and the opacity decreases by 25% of full opacity at each of the specified number of discrete steps.

17. The computer program product of claim 16, further configured to employ the user interface on the aircraft or in a flight control center.

18. The computer program product of claim 16, wherein the icon has a shape corresponding to a type of pilot report and the pilot report includes a location, an altitude, a time, and a description of the conditions reported.

19. The computer program product of claim 16, wherein the pilot report is regarding at least one selected from the group consisting of: current weather, forecasted weather, flight conditions and flight safety.

20. The computer program product of claim 16, wherein the weather data represents at least one selected from the group consisting of: severe turbulence, moderate turbulence, and moderate icing.

* * * * *